United States Patent
Takahashi et al.

(10) Patent No.: US 10,762,585 B2
(45) Date of Patent: Sep. 1, 2020

(54) ORDER INFORMATION PROCESSING DEVICE AND COMPUTER READABLE STORAGE MEDIUM

(71) Applicant: CASIO COMPUTER CO., LTD., Tokyo (JP)

(72) Inventors: Hiroshi Takahashi, Fuchu (JP); Kazuyoshi Toma, Tokorozawa (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 245 days.

(21) Appl. No.: 15/689,533

(22) Filed: Aug. 29, 2017

(65) Prior Publication Data

US 2018/0089771 A1 Mar. 29, 2018

(30) Foreign Application Priority Data

Sep. 28, 2016 (JP) .................................. 2016-190383

(51) Int. Cl.
*G06Q 50/10* (2012.01)
*G06Q 50/12* (2012.01)
*G06Q 30/06* (2012.01)
*G06F 3/0482* (2013.01)

(52) U.S. Cl.
CPC ......... *G06Q 50/12* (2013.01); *G06Q 30/0633* (2013.01); *G06Q 30/0635* (2013.01); *G06F 3/0482* (2013.01)

(58) Field of Classification Search
None
See application file for complete search history.

(56) References Cited

U.S. PATENT DOCUMENTS

| | | | | |
|---|---|---|---|---|
| 8,498,900 B1* | 7/2013 | Spirin | .................... | G06Q 50/00 340/286.09 |
| 2005/0071232 A1* | 3/2005 | Frater | .................... | G06Q 20/04 705/16 |
| 2005/0086117 A1* | 4/2005 | Kanisawa | .......... | G06Q 10/0637 705/7.36 |
| 2009/0265247 A1* | 10/2009 | Carroll | .................. | G06Q 20/20 705/15 |

FOREIGN PATENT DOCUMENTS

| | | |
|---|---|---|
| JP | H11-086140 A | 3/1999 |
| JP | 2006-190045 A | 7/2006 |
| JP | 2006-251956 A | 9/2006 |

(Continued)

OTHER PUBLICATIONS

European Search report dated Oct. 12, 2017 received in European Patent Application No. EP 17187577.6.

(Continued)

*Primary Examiner* — Paul Danneman
(74) *Attorney, Agent, or Firm* — Scully Scott Murphy & Presser

(57) ABSTRACT

An order information processing device includes: an input unit which receives input of one or more pieces of order information; and a processor which executes a function of: when an order information set is registered, the order information set including a plurality of pieces of the order information which are same as one another and are input together, segmenting the order information set to change or delete a part of the order information set.

6 Claims, 12 Drawing Sheets

(56) References Cited

FOREIGN PATENT DOCUMENTS

| JP | 2006-301821 A | 11/2006 |
| JP | 2011-175476 A | 9/2011 |

OTHER PUBLICATIONS

Notification of Reasons for Refusal dated Sep. 3, 2019 received in Japanese Patent Application No. JP 2016-190383 together with an English language translation.
Decision of Refusal dated Feb. 12, 2020 received in Japanese Patent Application No. JP 2016-190383 together with an English language translation.

* cited by examiner

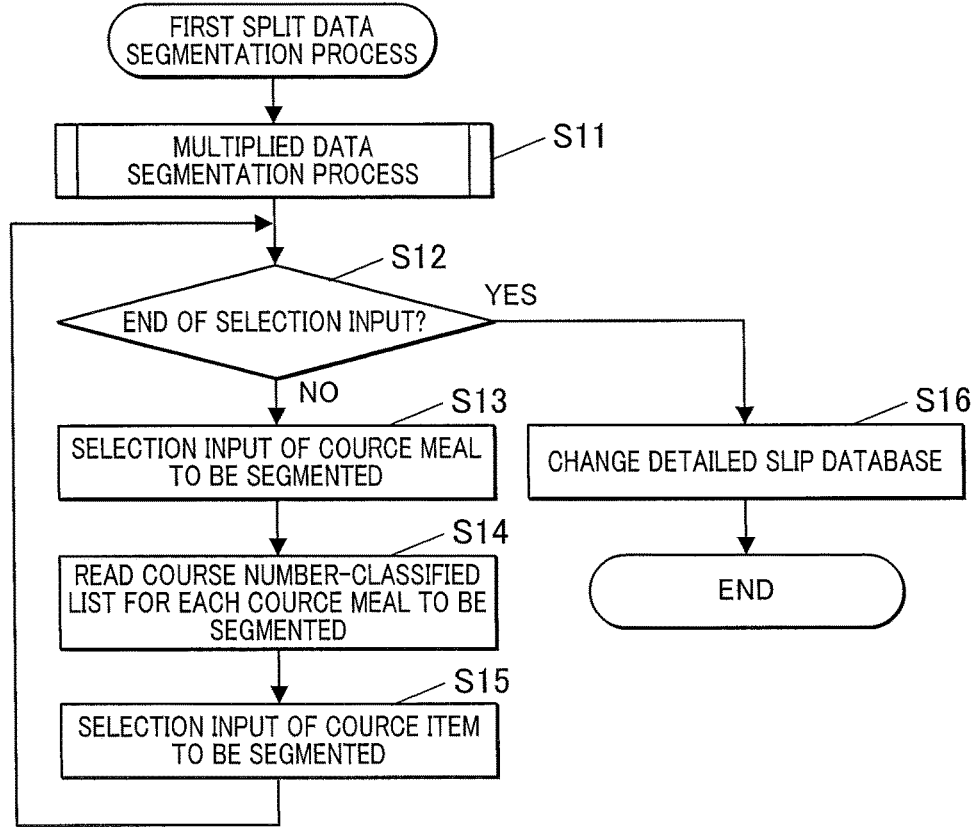

FIG. 8A

```
MANAGER 003    SLIP ISSUE    REGISTRATION OF SALES    2016/08/09 18:24
```

| TOTAL | ¥ 4,500 |
|---|---|
| TAX | ¥ 333 |

SLIP NO.  No.000002

GUEST(S) 3   CONTACT MANAGER 003

| | | |
|---|---|---|
| LUNCH-3 COURSE | 3 | ¥4,500 |
| GREEN SALAD | 2 | |
| CORN SOUP | 1 | |
| SIRLOIN STEAK | 3 | |
| RARE | 2 | |
| POTATO | 2 | |
| MEDIUM | 1 | |
| POTATO | 1 | |
| PENDING (DESSERT) | 3 | |

ITEM 1

| LUNCH-3 COURSE ¥1,500 | LUNCH APPETIZER COURSE ¥1,200 | LUNCH DESSERT COURSE ¥1,000 |
|---|---|---|

| PREMIUM | ITEM 2 | MAIN ITEMS A | MAIN ITEMS B |
|---|---|---|---|
| ITEM 1 | COMBINATION | SUBITEMS A | SUBITEMS B |

| QUIT TRANSACTION | TENTATIVE | SLIP | NEW/CALL | CORRECT | TRANSACTION KEY 1 | TRANSACTION KEY 2 | PAY |

```
MANAGER 003                SEGMENT              2016/08/09 18:25
```

| LUNCH-3 COURSE | 3 |
|---|---|
| MAIN | |
| 1  SIRLOIN STEAK RARE POTATO | |
| 2  SIRLOIN STEAK RARE POTATO | |
| 3  SIRLOIN STEAK MEDIUM POTATO | |

LUNCH-3 COURSE

- CORN SOUP
- SIRLOIN STEAK RARE POTATO
- PENDING (DESSERT)

CLOSE     SEGMENT 300, 310, 320, 330

| MANAGER 003 | SLIP ISSUE | REGISTRATION OF SALES | 2016/08/09 18:26 |

| TOTAL | ¥ 4,500 |
| TAX | ¥ 333 |

SLIP NO.  No.000002

GUEST(S) 3 | CONTACT MANAGER 003

ITEM 1

| LUNCH-3 COURSE ¥1,500 | LUNCH APPETIZER COURSE ¥1,200 | LUNCH DESSERT COURSE ¥1,000 |

G1:
| LUNCH-3 COURSE | 1 | ¥1,500 |
| CORN SOUP | 1 | |
| SIRLOIN STEAK | 1 | |
| RARE | 1 | |
| POTATO | 1 | |
| PENDING (DESSERT) | 1 | |

G2:
| LUNCH-3 COURSE | 2 | ¥3,000 |
| GREEN SALAD | 2 | |
| SIRLOIN STEAK | 2 | |
| RARE | 1 | |
| POTATO | 1 | |
| MEDIUM | 1 | |

Buttons: PREMIUM | ITEM 2 | MAIN ITEMS A | MAIN ITEMS B
ITEM 1 | COMBINATION | SUBITEMS A | SUBITEMS B 210A: QUIT TRANSACTION | TENTATIVE | SLIP | NEW/CALL | CORRECT | TRANSACTION KEY 1 | TRANSACTION KEY 2 | PAY

| TENTATIVE SLIP NUMBER (41) | SET NUMBER (42) | SET SUB-NUMBER (43) | LEVEL (44) | ITEM CODE (45) | QUANTITY (46) | UNIT PRICE (47) | AMOUNT (48) | COURSE NUMBER (49) | NUMBER OF PENDING ITEMS (50) |
|---|---|---|---|---|---|---|---|---|---|
| 000002 | 1 | 1 | 0 | 000001 | 1 | ¥1,500 | ¥1,500 | | |
| 000002 | 1 | 2 | 1 | 001002 | 1 | | | 1 | |
| 000002 | 1 | 3 | 1 | 002001 | 1 | | | 2 | |
| 000002 | 1 | 4 | 2 | 002101 | 1 | | | | |
| 000002 | 1 | 5 | 3 | 002201 | 1 | | | | |
| 000002 | 1 | 6 | 1 | | | | | 3 | 1 |
| 000002 | 2 | 1 | 0 | 000001 | 2 | ¥1,500 | ¥3,000 | | |
| 000002 | 2 | 2 | 1 | 001001 | 2 | | | 1 | |
| 000002 | 2 | 3 | 1 | 002001 | 2 | | | 2 | |
| 000002 | 2 | 4 | 2 | 002101 | 1 | | | | |
| 000002 | 2 | 5 | 3 | 002201 | 1 | | | | |
| 000002 | 2 | 6 | 2 | 002102 | 1 | | | | |
| 000002 | 2 | 7 | 3 | 002201 | 1 | | | | |
| 000002 | 2 | 8 | 1 | | | | | 3 | 2 |

R1 = rows with SET NUMBER 1; R2 = rows with SET NUMBER 2

| TENTATIVE SLIP NUMBER | SET NUMBER | SET SUB-NUMBER | LEVEL | ITEM CODE | QUANTITY | UNIT PRICE | AMOUNT | COURSE NUMBER | NUMBER OF PENDING ITEMS |
|---|---|---|---|---|---|---|---|---|---|
| 000002 | 1 | 1 | 0 | 000001 | 2 | ¥1,500 | ¥3,000 | | |
| 000002 | 1 | 2 | 1 | 001001 | 2 | | | 1 | |
| 000002 | 1 | 3 | 1 | 002001 | 2 | | | 2 | |
| 000002 | 1 | 4 | 2 | 002101 | 1 | | | | |
| 000002 | 1 | 5 | 3 | 002201 | 1 | | | | |
| 000002 | 1 | 6 | 2 | 002102 | 1 | | | | |
| 000002 | 1 | 7 | 3 | 002201 | 1 | | | | |
| 000002 | 1 | 8 | 1 | | | | | 3 | 2 |
| : | : | : | : | : | : | : | : | : | : |

FIG.13

| TENTATIVE SLIP NUMBER | SET NUMBER | SET SUB-NUMBER | LEVEL | ITEM CODE | QUANTITY | UNIT PRICE | AMOUNT | COURSE NUMBER | NUMBER OF PENDING ITEMS |
|---|---|---|---|---|---|---|---|---|---|
| 000002 | 1 | 1 | 0 | 000001 | 3 | ¥1,500 | ¥4,500 | | |
| 000002 | 1 | 2 | 1 | 001001 | 3 | | | 1 | |
| 000002 | 1 | 3 | 1 | 002001 | 3 | | | 2 | |
| 000002 | 1 | 4 | 2 | 002101 | 3 | | | | |
| 000002 | 1 | 5 | 3 | 002201 | 3 | | | | |
| 000002 | 1 | 6 | 1 | | | | | 3 | 3 |
| : | : | : | : | : | : | : | : | : | : |

FIG.14

| MANAGER 003 | SLIP ISSUE | REGISTRATION OF SALES | 2016/08/09 18:27 |
|---|---|---|---|

| TOTAL | ¥ 4,500 |
|---|---|
| TAX | ¥ 333 |
| SLIP NO. No.000002 | |

| GUEST(S) 3 | CONTACT MANAGER 003 | |
|---|---|---|
| LUNCH-3 COURSE | 3 | ¥4,500 |
| GREEN SALAD | 3 | |
| SIRLOIN STEAK | 3 | |
| RARE | 3 | |
| POTATO | 3 | |
| PENDING (DESSERT) | 3 | |

ITEM 1

| LUNCH-3 COURSE ¥1,500 | LUNCH APPETIZER COURSE ¥1,200 | LUNCH DESSERT COURSE ¥1,000 |
|---|---|---|

| PREMIUM | ITEM 2 | MAIN ITEMS A | MAIN ITEMS B |
|---|---|---|---|
| ITEM 1 | COMBINATION | SUBITEMS A | SUBITEMS B |

| QUIT TRANSACTION | TENTATIVE | SLIP | NEW/CALL | CORRECT | TRANSACTION KEY 1 | TRANSACTION KEY 2 | PAY |
|---|---|---|---|---|---|---|---|

| TENTATIVE SLIP NUMBER | SET NUMBER | SET SUB-NUMBER | LEVEL | ITEM CODE | QUANTITY | UNIT PRICE | AMOUNT | COURSE NUMBER | NUMBER OF PENDING ITEMS |
|---|---|---|---|---|---|---|---|---|---|
| 41 | 42 | 43 | 44 | 45 | 46 | 47 | 48 | 49 | 50 |
| 000002 | 1 | 1 | 0 | 000001 | 3 | ¥1,500 | ¥4,500 | | |
| 000002 | 1 | 2 | 1 | 001001 | 3 | | | 1 | |
| 000002 | 1 | 3 | 1 | 002001 | 1 | | | 2 | |
| 000002 | 1 | 4 | 2 | 002101 | 1 | | | | |
| 000002 | 1 | 5 | 3 | 002201 | 1 | | | | |
| 000002 | 1 | 6 | 1 | 002001 | 2 | | | 2 | |
| 000002 | 1 | 7 | 2 | 002101 | 2 | | | | |
| 000002 | 1 | 8 | 3 | 002201 | 2 | | | | |
| 000002 | 1 | 9 | 1 | | | | | 3 | 3 |
| : | : | : | : | : | : | : | : | : | : |

R3: rows 4–6; R4: rows 7–9

| TENTATIVE SLIP NUMBER | SET NUMBER | SET SUB-NUMBER | LEVEL | ITEM CODE | QUANTITY | UNIT PRICE | AMOUNT | COURSE NUMBER | NUMBER OF PENDING ITEMS |
|---|---|---|---|---|---|---|---|---|---|
| 41 | 42 | 43 | 44 | 45 | 46 | 47 | 48 | 49 | 50 |
| 000002 | 1 | 1 | 0 | 000001 | 3 | ¥1,500 | ¥4,500 | | |
| 000002 | 1 | 2 | 1 | 001001 | 3 | | | 1 | |
| 000002 | 1 | 3 | 1 | 002001 | 1 | | | 2 | |
| 000002 | 1 | 4 | 2 | 002101 | 1 | | | | |
| 000002 | 1 | 5 | 3 | 002201 | 1 | | | | |
| 000002 | 1 | 6 | 2 | 010001 | 1 | ¥100 | ¥100 | | |
| 000002 | 1 | 7 | 2 | 010002 | 1 | ¥100 | ¥100 | | |
| 000002 | 1 | 8 | 1 | 002001 | 2 | | | 2 | |
| 000002 | 1 | 9 | 2 | 002101 | 2 | | | | |
| 000002 | 1 | 10 | 3 | 002201 | 2 | | | | |
| 000002 | 1 | 11 | 1 | | | | | 3 | 3 |
| : | : | : | : | : | : | : | : | : | : |

R3: rows 4–6; R5: rows 7–8; R4: rows 9–11

FIG.17

| MANAGER 003 | SLIP ISSUE | REGISTRATION OF SALES | 2016/08/09 18:31 |

| TOTAL | ¥ 4,700 |
|---|---|
| TAX | ¥ 348 |

SLIP NO. No.000002

| GUEST(S) 3 | CONTACT MANAGER 003 |

| | | |
|---|---|---|
| LUNCH-3 COURSE | 3 | ¥4,500 |
| GREEN SALAD | 3 | |
| SIRLOIN STEAK | 1 | |
| RARE | 1 | |
| POTATO | 1 | |
| ONION | 1 | ¥100 |
| MASHROOM | 1 | ¥100 |
| SIRLOIN STEAK | 2 | |
| RARE | 2 | |
| POTATO | 2 | |
| PENDING (DESSERT) | 3 | |

G3, G5, G4, 210D

PRICED MODIFICATION A

| POTATO | ONION | MASHROOM |
|---|---|---|
| ¥100 | ¥100 | ¥100 |
| ASPARAGUS | CARROT | |
| ¥100 | ¥100 | |

220

| PRICED MODIFICATION A | PRICED MODIFICATION B | PRICED MODIFICATION C | DRINK A |
| FREE MODIFICATION A | FREE MODIFICATION B | FREE MODIFICATION C | ALCOHOL A |

| QUIT TRANSACTION | TENTATIVE | SLIP | NEW/CALL | CORRECT | TRANSACTION KEY 1 | TRANSACTION KEY 2 | PAY |

200D

ORDER INFORMATION PROCESSING DEVICE AND COMPUTER READABLE STORAGE MEDIUM

CROSS-REFERENCE TO RELATED APPLICATIONS

This application is based upon and claims the benefit of priority from the Japanese Patent Application No. 2016-190383 filed Sep. 28, 2016, the entire disclosure of which is incorporated herein by reference.

BACKGROUND OF THE INVENTION

Field of the Invention

The present invention relates to an order information processing device and a computer readable storage medium.

Description of the Related Art

Heretofore, there has been known an order data managing system used in eating places, such as restaurant, each including a handy terminal that receives input of information on guests' orders by a waitperson and a printer at kitchen that receives to print the order information. Chefs prepare the menu based on the printed order information.

For example, an order data managing system is known that receives input of the order information on a course meal consisting of several dishes by a waitperson with a handy terminal (Japanese Patent Application Laid-Open Publication No. 2006-251956). This order data managing system can input a dish, such as a dessert, selected during the course meal.

Unfortunately, the order data managing system cannot segment the order information consisting of course meals ordered by several persons and inputted as a whole. In detail, the system cannot delete the order information on the course meal for one person from the course meals in the group, or cannot input additional order information, such as addition of a modifying item (e.g., topping of the main dish) on one course meal among the several course meals. Thus, after deletion of the entire order information on the several course meals, the order information on the course meals from which one course meal is eliminated should be re-inputted; or the order information on the course meals including one modified course meal should be inputted. The waitperson thus has a heavy workload.

SUMMARY OF THE INVENTION

According to a first aspect of the present invention, there is provided an order information processing device for processing order information including: an input unit which receives input of one or more pieces of order information; and a processor which executes a function of: segmenting an order information set including a plurality of pieces of the order information which are same as one another and are input together, to change or delete a part of the order information set, when the order information set is registered.

According to a second aspect of the present invention, there is provided a computer readable storage medium storing a program executable by a computer which controls a device including an input unit to receive input of one or more pieces of order information, the program causing the computer to execute a function of: segmenting an order information set including a plurality of pieces of the order information which are same as one another and are input together, to change or delete a part of the order information set, when the order information set is registered.

According to a third aspect of the present invention, there is provided a computer readable storage medium storing a program executable by a computer which controls a device including an input unit to receive input of one or more pieces of order information and a display unit, the program causing the computer to execute a function of: segmenting an order information set including a plurality of pieces of the order information which are same as one another and are input together, to change or delete a part of the order information set, when the order information set is registered, and causing the display unit to display the segmented order information set as a slip information list, and causing the input unit to receive input of the order information on a subject to be deleted or changed.

BRIEF DESCRIPTION OF THE SEVERAL VIEWS OF THE DRAWINGS

The following description with reference to the accompanying drawings can contribute to better understanding of the invention.

FIG. 3A illustrates a configuration of a slip database.

FIG. 3B illustrates a configuration of a first detailed slip database.

FIG. 4 is a flow chart illustrating a first slip data segmentation process.

FIG. 8A illustrates a first slip data display screen after registration of the slip data.

FIG. 8B illustrates a first course item selection screen.

FIG. 9 illustrates a second slip data display screen after segmentation of a course meal.

FIG. 10 illustrates a second detailed slip database after segmentation of a course meal.

FIG. 13 illustrates a fourth detailed slip database.

FIG. 14 illustrates a third slip data display screen after registration of the slip data.

FIG. 15A illustrates a second course item selection screen.

FIG. 15B illustrates a fourth slip data display screen after segmentation of the course items.

FIG. 16A illustrates a fifth detailed slip database after segmentation of the course item.

FIG. 16B illustrates a sixth detailed slip database after addition of the record of the modifying item.

FIG. 17 illustrates a fifth slip data display screen after addition of the modifying item.

DETAILED DESCRIPTION OF THE PREFERRED EMBODIMENTS

The embodiments of the present invention will now be described in detail with reference to the accompanying drawings, which should not be construed to limit the scope of the present invention.

Figure 1:
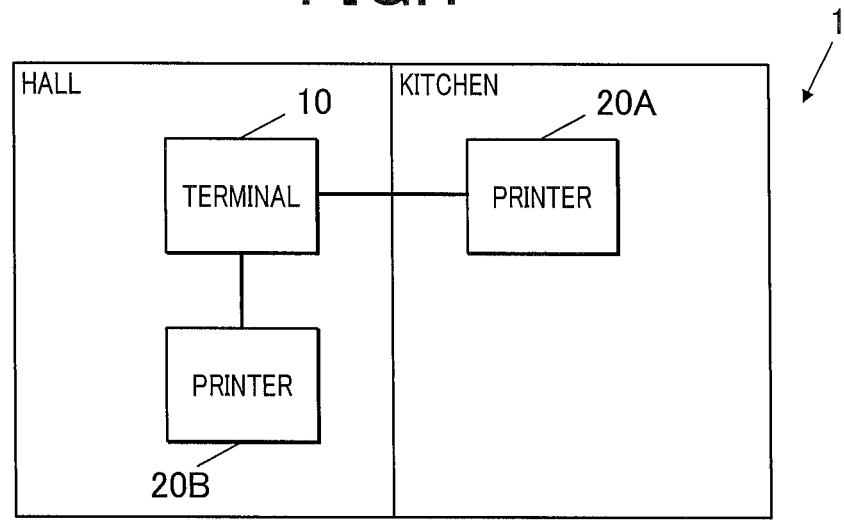
FIG. 1 is a block diagram illustrating an order managing system according to an embodiment of the present invention.
Figure 2:
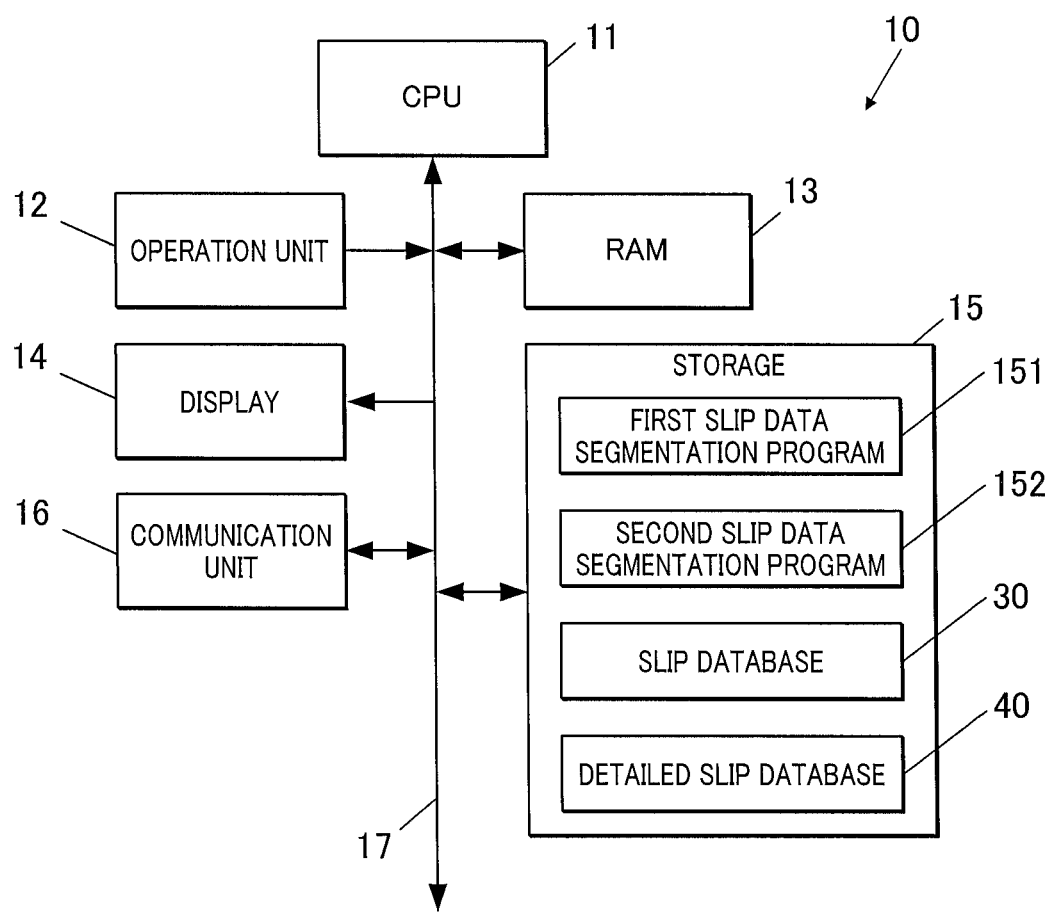
FIG. 2 is a block diagram illustrating a functional configuration of a terminal.

The device configuration of the embodiment will now be described with reference to FIGS. 1 and 2. FIG. 1 is a block diagram illustrating an order managing system 1 according to the embodiment. FIG. 2 is a block diagram illustrating a functional configuration of a terminal 10.

The order managing system 1 is disposed at an eating place, such as a restaurant, receives input of the order information on menu items, such as guests' courses, manages the order information as slip information, prints the order information at a kitchen to instruct coking, and prints a slip (check) for checkout after guests' drinking and eating. As shown in FIG. 1, the order managing system 1 includes a terminal 10 as a slip information processing device, and printers 20A and 20B.

The eating place has a hall and a kitchen. The hall is provided with a plurality of tables and chairs disposed for guests and waitpersons move therein. In the kitchen, chefs cook. A terminal 10 is disposed in the hall to receive the information inputted by waitpersons, to manage various types of information, and to instruct the printers 20A and 20B to print the information.

The printer 20A disposed in the kitchen is, for example, a thermal printer and prints the order information for cooking on a recording medium, such as a rolled sheet under instructions from the terminal 10. The printer 20B disposed in the hall is, for example, a thermal printer and prints the information on slips onto a recording medium, such as a rolled sheet under instructions from the terminal 10. Although the terminal is in wired communication with the printers 20A and 20B, the terminal may be in wireless communication with the printers.

The order managing system 1 may include a plurality of terminals 10 for different applications, such as for inputting information and checkout, in place of the single multitask terminal 10. The order managing system 1 may include a plurality of printers 20A for different applications, such as for appetizers, main dishes, and desserts depending on the scale and layout of the kitchen in place of the single multitask printer 20A.

With reference to FIG. 2, the terminal 10 includes a central processing unit (CPU) 11 functioning as a segmenting unit/member, an operation unit 12 as an operation member, a random-access memory (RAM) 13, a display 14 functioning as a display unit/member, a storage 15, and communication unit 16. Each portion of the terminal 10 is connected through a bus 17.

The CPU 11 comprehensively controls the terminal 10. The CPU 11 retrieves specified programs from the system programs and application programs stored in the storage into the RAM 13 for performing various processes in corporation with the retrieved programs. The CPU 11 includes an arithmetic device, such as a processor.

The operation unit (input or selecting unit/member) 12 is a touch panel integrated with a display screen of the display 14, receives touch input carried out by an operator (waitperson), and outputs the operational information to the CPU 11.

The RAM 13, which is a volatile memory, functions as a work area for temporarily storing different types of data and programs. The display 14 is, for example, a liquid crystal display (LCD), or electroluminescent (EL) display and performs various displays according to display information under instruction of the CPU 11 (a display controlling member).

The storage 15 (a registration unit/member) is composed of a hard disk drive (HDD), solid-state drive (SSD), and/or a flash memory and can read and write data and programs. The storage 15 stores a first slip data segmenting program 151, a second slip data segmenting program 152, a slip database 30, and a detailed slip database 40.

The communication unit 16 is in wired communication with the printers 20A and 20B through a cable for reception/transmission of information.

With reference to FIGS. 3A and 3B, the configuration of the slip database 30 and the detailed slip database 40 stored in the storage 15 will now be described. FIG. 3A illustrates the configuration of the slip database 30; and FIG. 3B illustrates the configuration of the detailed slip database 40.

The slip database 30 consists of a data table of the information on slips corresponding to a guest or a group of guests visiting the eating place. As shown in FIG. 3A, the slip database 30 consists of fields or items of tentative slip number 31, table number 32, waitperson code 33, and the number of guests 34.

The tentative slip number 31 is identification information on a tentative slip before the checkout of the restaurant. The table number 32 is identification information on the table occupied by a guest or guests corresponding to the slip with the tentative slip number 31. The waitperson code 33 is identification information on the waitperson who meets the guest(s) corresponding to the slip with the slip number 31. The number of guests 34 corresponds to the slip with the slip number 31.

The detailed slip database 40 contains the details of the slip in the slip database 30. As shown in FIG. 3B, the detailed slip database 40 consists of the fields of a tentative slip number 41, set number 42, set sub-number 43, level 44, item code 45, quantity 46, unit price 47, amount 48, course number 49, and number of pending items 50.

The tentative slip number 41 is identification information on the slip, corresponding to the tentative slip number 31. The set number 42 is identification information allocated to the order unit (level=0) of the course meal(s) of the guest(s) in the slip with the tentative slip number 41. For example, in the case that two or more identical course meals are inputted together by multiplication in a table occupied by a group of guests corresponding to the same tentative slip number 41, the same set number is assigned to these course meals.

Strictly speaking, one "course meal" consists of several dishes or items that are provided in a predetermined sequence, whereas one "set meals" consists of several dishes or items that are provided in random order. In this embodiment, these two meals are called "course meal" collectively.

The multiplied input of the order information for inputting identical course meals at once will now be described. For simplicity, assume that the ordered course meal is a "lunch-3 course". The "lunch-3 course" consists of three dishes, i.e., "appetizer", "main", and "dessert", and each dish can be selected from several items. The items of the essential dishes of the course meal are called course items.

The "appetizer" is selectable from menu items, such as "green salad" and "corn soup". The "main" is selectable from items, such as "sirloin steak". As the "main", also one or more modifying items are selectable. The modifying items include "doneness", "side" and "sauce". Also "topping" is selectable as additional order of the "main". The "doneness" is selectable from, for example, "rare" and "medium". A typical example of the "side" is "potato". A typical example of the "sauce" is "ketchup". Examples of the "topping" include "onion" and "mushroom". The "dessert" is selectable from items, such as "apple pie", "sherbet", and "cream parfait".

The multiplied input involves input of the order information on the course meals and the course items for several guests, and the order information on the modifying item(s) for each course item. An example multiplied input will now be explained where the waitperson inputs five course meals (lunch-3 course) of five guests on a table through the operation unit 12 of the terminal 10. For example, the multiplied input involves input of the course meal (lunch-3 course×5)→input of the first course item or appetizer (green salad×3 and corn soup×2)→input of the second course item or main (sirloin steak×5)→input of the first modifying item or doneness (rare×3 and medium×2)→input of the second modifying item corresponding to side rare×3→input of the third modifying item or sauce corresponding to rare×3→input of the side corresponding to medium×2→input of the sauce corresponding to medium×2→and input of the third course item or dessert (for example, pending of item order).

The set sub-number 43 is serial number information that identifies the single-item course or the ordered item (the course meal, the course item, or modifying item for the course meal) among the course meals in the set number 42. A combination of the set number 42 and the set sub-number 43 can define a unique record in the slip (detailed slip database 40). The level 44 indicates the level of the course meal or the item corresponding to the tentative slip number 41, the set number 42, and the set sub-number 43. The level 44 is "0" for the course meal, "1" for the course item lower than level "0" for the course meal, "2" for the modifying item (for example, doneness or topping) lower than level "1" for the course item, "3" for the modifying item (for example, side) lower than level "2" for the above modifying item, or "4" for the modifying item (for example, source) lower than level "3" for the above modifying item.

The item code 45 is identification information on the single-item course, the course meal, or the item of the course meal that is served on the eating place ordered by the guest(s) and that corresponds to the slip of the tentative slip number 41. For simplicity, the item code 45 is identification information to identify the course meal or item corresponding to the tentative slip number 41, the set number 42, and the set sub-number 43. The quantity 46 is the number of items with an item code 45. The unit price 47 is the unit price of the item with an item code 45. The amount 48 is the amount (=unit price 47×quantity 46) of the item with the item code 45.

The course number 49 is serial number information to identify the course item of the course meal in the case that the item of the item code 45 is a course item. The number of pending items 50 indicates the number of order-pending items that correspond to the tentative slip number 41, the set number 42, and the set sub-number 43. For example, three of the guests corresponding to the slip of the tentative slip number 41 have an order of the course meal "lunch-3 course", an appetizer, and a main, but suspend the order of the dessert. In such a case, the number of pending items 50 in the record of the dessert is three.

The slip database 30 and the detailed slip database 40 contain only records on unadjusted slips of guests in the eating place. The terminal 10 issues a slip for a guest asking for the check through the printer 20B based on the slip information in response to the operation of the operation unit 12 by a waitperson. The waitperson hands over the issued slip to the guest, who pays for the meals at the checkout counter. After the payment, the record on this guest is deleted from the slip database 30 and the detailed slip database 40.

Figure 5:
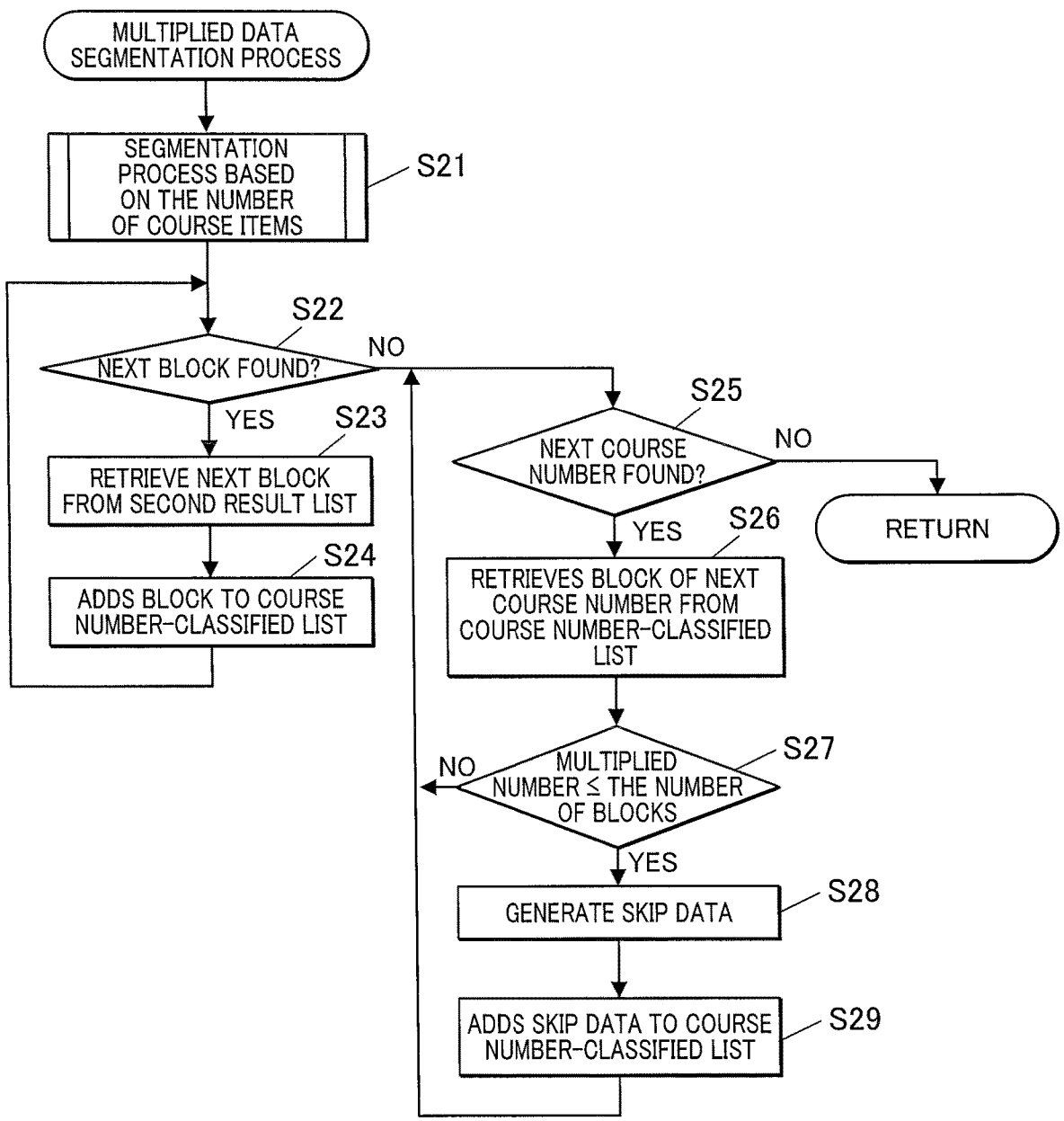
FIG. 5 is a flow chart illustrating a multiplied data segmentation process.
Figure 6:
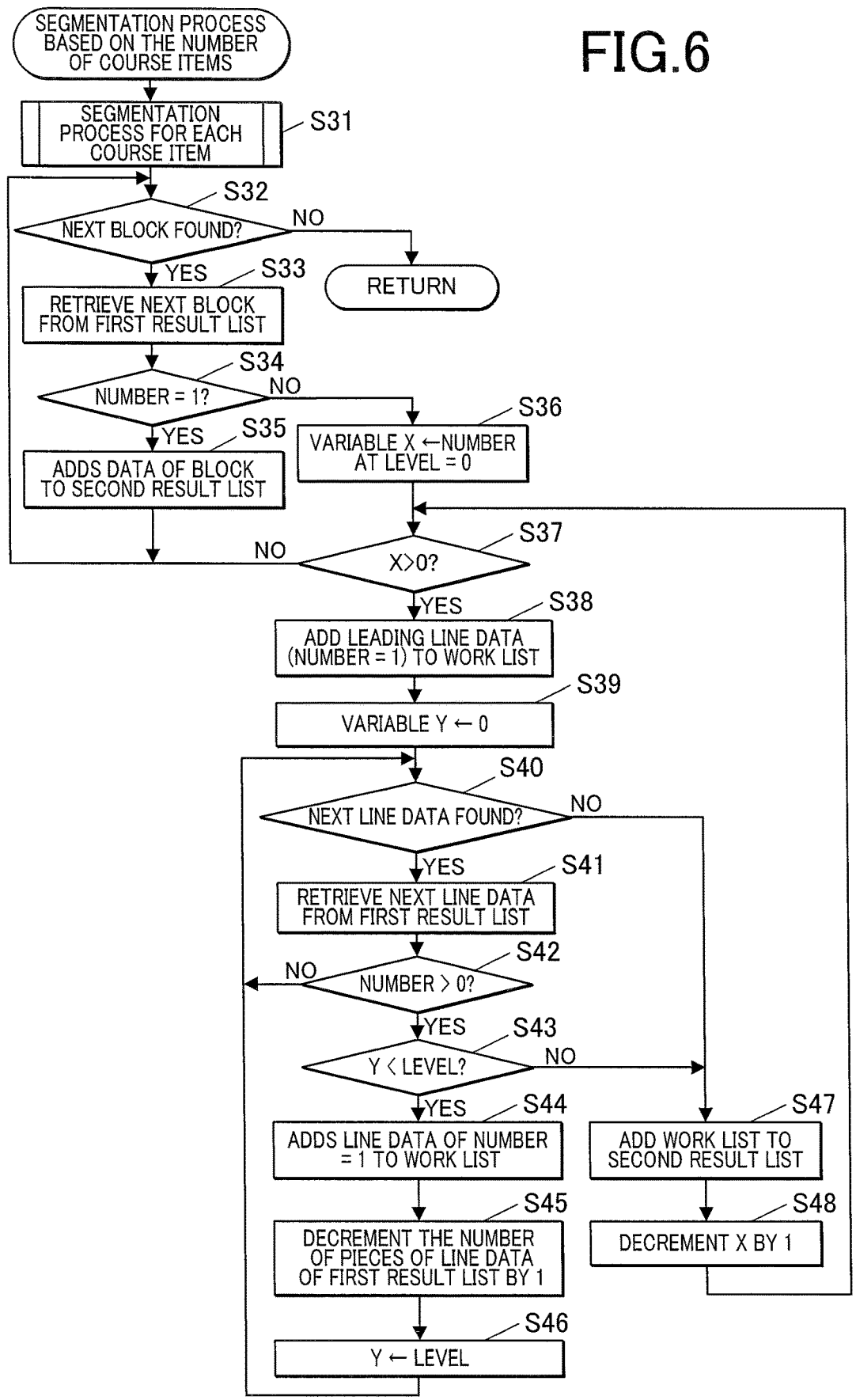
FIG. 6 is a flow chart illustrating a segmentation process based on the number of course items.
Figure 7:
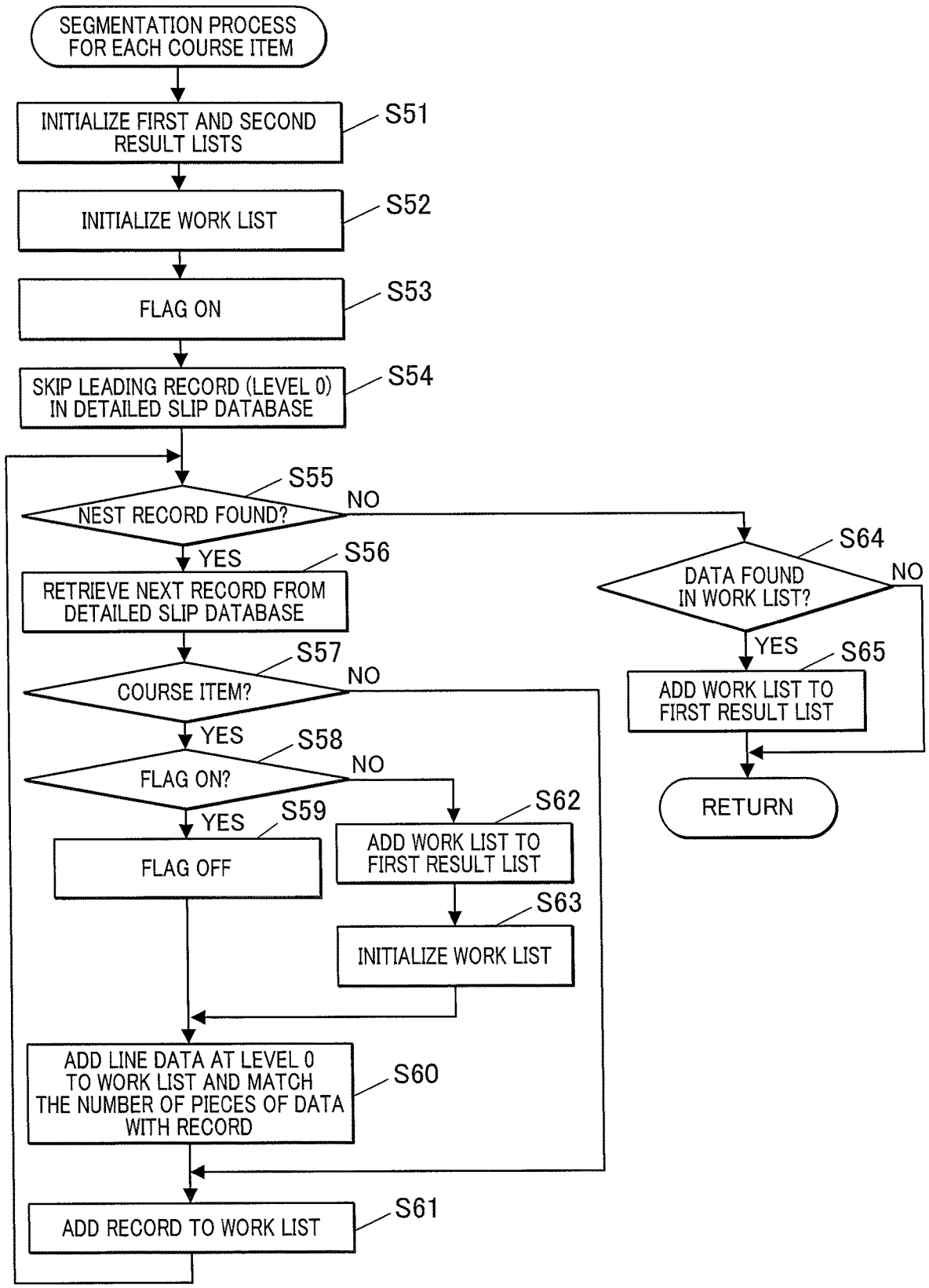
FIG. 7 is a flow chart illustrating a segmentation process for each course item.

With reference to FIGS. 4 to 17, the operation of the order managing system 1 will be explained. With reference to FIGS. 4 to 7, the first slip data segmentation process carried out by the terminal 10 will be explained. FIG. 4 is a flow chart illustrating the first slip data segmentation process. FIG. 5 is a flow chart illustrating a multiplied data segmentation process. FIG. 6 is a flow chart illustrating a segmentation process based on the number of course items. FIG. 7 is a flow chart illustrating a segmentation process for each course item.

The first slip data segmentation process segments the record of the course meals by the course meal unit, where the record is stored in the detailed slip database 40 generated by the multiplied input of the course meals contained in the same table or slip. When the waitperson inputs the order of course meals by a group of guests occupying a table in the eating place through the operation unit 12, the terminal 10 preliminarily generates the detailed slip database 40 shown in, for example, FIG. 3B and stores it in the storage 15.

Suppose that the specified number of course meal(s) among the ordered course meals should be cancelled from the detailed slip database 40 in response to request for the partial cancel of the order by the group. Since the detailed slip database 40 contains the integrated record by the multiplied input of these course meals, the record in the detailed slip database 40 should preferably be segmented to the course meal unit. For example, the detailed slip database 40 contains a single record at level 44=0 that is stored through one multiplied input of several course meals and their items.

In response to input of an instruction to perform the first slip data segmentation process by the waitperson through the operation unit 12 of the terminal 10, the CPU 11 performs the first slip data segmentation process in cooperation with the first slip data segmenting program 151 that is retrieved from the storage 15 and loaded in the RAM 13.

With reference to FIG. 4, the CPU 11 performs the multiplied data segmentation process (Step S11). With reference to FIG. 5, the multiplied data segmentation process in Step S11 will be explained. As shown in FIG. 5, the CPU 11 firstly performs the segmentation process based on the number of course items (Step S21). With reference to FIG. 6, the segmentation process based on the number of course items in Step S21 will be explained. As shown in FIG. 6, the CPU 11 firstly performs the segmentation process for each course item (Step S31).

With reference to FIG. 7, the segmentation process for each course item in Step S31 will be explained. As shown in FIG. 7, the CPU 11 firstly initializes first and second result lists stored in the RAM 13 (Step S51). The first result list is the result data of the segmentation process executed to the detailed slip database 40 based on the number of course items, where the data is a list of segmented course items. The second result list is the result data of the segmentation process executed to the detailed slip database 40 for each course item, where the data is a list of each segmented course item. The CPU 11 initializes a work list as data in a work area in the RAM (Step S52). The work list is work data necessary for creation of the first and second result lists.

The CPU 11 then sets the flag to ON at level=zero (Step S53). The CPU 11 retrieves the detailed slip database 40 from the storage 15, and skips the leading record at level 44=0 in the detailed slip database 40 (Step S54).

The CPU 11 then determines whether the next record (unread record) exists in the detailed slip database 40 retrieved in Step S54 (Step S55). If the next record exists (Step S55; YES), the CPU 11 retrieves this record from the detailed slip database 40 (Step S56). The CPU 11 then checks for the level 44 of the record retrieved in Step S56 and determines whether the record is of a course item (level 44=1) (Step S57).

In the case of the record of the course item (Step S57; YES), the CPU 11 determines whether the flag is ON (Step S58). If the flag is ON (Step S58; YES), the CPU 11 sets the flag to OFF (Step S59). The CPU 11 then adds the line data of the item code 45 at level 44=0 in the detailed slip database 40 to the work list, and changes the number (quantity) of the line data so as to correspond to the quantity 46 retrieved in Step S56 (Step S60).

The CPU 11 adds the line data, such as level 44, item code 45, quantity 46, and course number 49, of the record retrieved in Step S56 to the work list (Step S61), and then the process goes to Step S55.

If the flag is OFF (Step S58; NO), the CPU 11 adds the data of the content of the work list to the first result list stored in the RAM 13 (Step S62). The CPU 11 then initializes the worklist (Step S63), and the process goes to Step S60. If the record is not of the course item (Step S57; NO), the record is of the modifying item. The process then goes to Step S61.

If the next record does not exist (Step S55; NO), the CPU 11 determines whether the data exists in the work list (Step S64). If the data exists in the work list (Step S64; YES), the CPU 11 adds the data of the content of the work list to the first result list (Step S65), and the segmentation process for each course item is completed. If no data exists in the work list (Step S64; NO), the segmentation process for each course item is completed.

The first result list after the segmentation process for each course item is list data containing the line data of the course meal including the number of course items, the line data of the course item, and the line data of the modifying item for each course item. The group of the line data for each course item in the first result list is defined as a block.

Referring again to FIG. 6, the CPU 11 retrieves the first result list from the RAM 13 after Step S31, and determines whether the next or unread block exists in the first result list (Step S32). If no block exists (Step S32; NO), the segmentation process based on the number of course items is completed.

If the next block exists (Step S32; YES), the CPU retrieves the next or unread block from the first result list (Step S33). The CPU 11 determines whether the number (quantity) of the course meals (course items) of the block of the first result list retrieved in Step S33 is one (Step S34). If the number is one (Step S34; YES), the CPU 11 adds the data of this block retrieved in Step S33 to the second result list stored in the RAM 13 (Step S35), and the process goes to Step S32.

If the number is greater than one (Step S34; NO), the CPU 11 replaces the number of the course meals at level=zero of the block retrieved in Step S33 with a variable X (Step S36).

The CPU 11 determines whether X>0 (Step S37). If X=zero (Step S37; NO), the process goes to Step S32. If X>0 (Step S37; YES), the CPU 11 adds the leading line data of the block of the first result data retrieved in Step S33 to the work list (Step S38). The CPU 11 then replaces the variable Y with zero (Step S39).

The CPU 11 determines whether the next line data exists in the block of the first result list retrieved in Step S33 (Step S40). If the next line data exists (Step S40; YES), the CPU 11 retrieves this line data from the block of the first result list retrieved in Step S33 (Step S41).

The CPU 11 determines whether the number (quantity) of the line data retrieved in Step S41 is greater than zero (Step S42). If the number=zero (Step S42; NO), the process goes to Step S40. If the number>0 (Step S42; YES), the CPU 11 determines whether the variable Y is smaller than the level of the line data retrieved in Step S41 (Step S43).

If Y<the level (Step S43; YES), the CPU 11 adds the line data of number=one retrieved in Step S41 to the work list stored in the RAM 13 (Step S44). The CPU 11 then decrements the number of the line data of the first result list retrieved in Step S41 by one (Step S45). The CPU 11 replaces the variable Y with the level of the line data retrieved in Step S41 (Step S46), and the process goes to Step S40.

If the next data does not exist (Step S40; NO), the CPU 11 adds the data of the content of the work list to the second result list (Step S47). If Y the level (Step S43; YES), the process goes to Step S47. The CPU decrements the variable X by one (Step S48), the process goes to Step S37.

The second result list after completion of the segmentation process based on the number of course items is list data containing the line data of one course meal, the line data of the course item, and the line data of the modifying item for each course item. The group of the line data for each type (appetizer, main or dessert) of the course item in the second result list is defined as a block.

With reference again to FIG. 5, the CPU 11 retrieves the second result list from the RAM 13 after Step S21, and determines whether the next or unread block exists in the second result list (Step S22). If the next or unread block exists (Step S22; YES), the CPU 11 retrieves the next or unread block from the second result list (Step S23). The CPU 11 then generates the course number indicating the type of the course item, and adds the block of the second result list retrieved from Step S23 and the course number to the course number-classified list stored in the RAM 13 (Step S24), and the process goes to Step S22. The course number is, for example, one for appetizer, two for main, and three for dessert.

If the next block does not exist (Step S22; NO), the CPU 11 retrieves the course number-classified list from the RAM 13, and determines whether (the block of) the next course number that is not retrieved exists in the course number-classified list (Step S25). If the next course number does not exist (Step S25; NO), the multiplied data segmentation process is completed.

If the next course number exists (Step S25; YES), the CPU 11 retrieves the block of this course number from the course number-classified list retrieved in Step S25 (Step S26). The CPU 11 determines whether the multiplied number (the quantity 46 of the course meals in the detailed slip database 40) is greater than the number of blocks of the course number retrieved in Step S25 (the number of line data of the course item) (Step S27).

If the multiplied number the number of blocks (Step S27; NO), the process goes to Step S25. If the multiplied number>the number of blocks (Step S27; YES), the CPU 11 generates skip data consisting of the line data of the course meals and the line data indicating the skip of the course item corresponding to the course number retrieved in Step S25, where the number of the skip data equals the difference between the multiplied number and the number of blocks (Step S28). The "skip" indicates that the guest does not order this course item.

The CPU 11 adds the skip data generated in Step S28 to the block of the course number of the course number-classified list retrieved in Step S26 (Step S29), and the process goes to Step S25.

Referring again to FIG. 4, the CPU 11 after Step S11 determines whether the selection input of the course meal to be segmented and its course item (and the modifying item) is completed depending on the input of the instruction of segmentation through the operation unit 12 by the waiterperson (Step S12).

If the selection input is not completed (Step S12; NO), the CPU 11 retrieves the detailed slip database 40 from the storage 15, generates course meal selection screen information based on the detailed slip database 40 to display it on the display 14, and receives the input of the selection of the course meal to be segmented through the operation unit 12 by the waiterperson (Step S13). The CPU 11 retrieves the course number-classified list corresponding to the course meal selected in Step S13 from the RAM 13 (Step S14).

The CPU 11 generates course item selection screen information based on the course number-classified list retrieved in Step S14, display it on the display 14, and receives input of selection of a combination of the course item and the modifying item in the course meal to be segmented through the operation unit 12 by the waiterperson (Step S15), and the process goes to Step S12.

When the input selection is completed (Step S12; YES), the CPU 11 updates the detailed slip database 40 so as to segment the record of the course meal having the course item and modifying item that are selected in Step S15 (Step S16), and the first slip data segmentation process is completed.

Figures 11, 12:
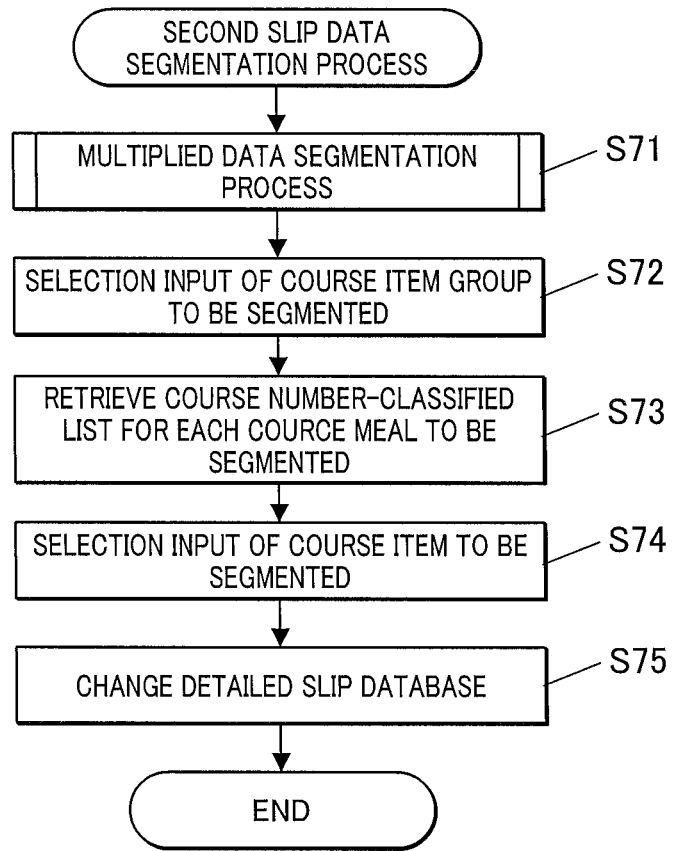
FIG. 11 illustrates a third detailed slip database after deletion of the record of the segmented course meal.
FIG. 12 is a flow chart illustrating a second slip data segmentation process.

With reference to FIGS. 8A to 11, a specific example of the first slip data segmentation process will be described. FIG. 8A illustrates a slip data display screen 200 after registration of the slip data. FIG. 8B illustrates a course item selection screen 300. FIG. 9 illustrates a slip data display screen 200A after segmentation of a course meal. FIG. 10 illustrates a detailed slip database 40A after segmentation of a course meal. FIG. 11 illustrates a detailed slip database 40B after deletion of the record of the segmented course meal.

The waitperson performs multiplied input of the course meal through the terminal 10 to store the detailed slip database 40 shown in FIG. 3B into the storage 15. The item codes 45 of the detailed slip database 40 are as follows: 000001 for lunch-3 course (course meal), 001001 for green salad (course item: appetizer), 001002 for corn soup (course item: appetizer), 002001 for sirloin steak (course item: main), 002101 for rare (modifying item: doneness), 002201 for potato (modifying item: side), 002102 for medium (modifying item: doneness), and 002201 for potato (modifying item: side). The column of the pending dessert of the course item is vacant.

In detail, for example, three guests sit at the same table; one of the guest orders a lunch-3 course (green salad, sirloin steak (rare, potato), dessert (pending)), another one orders a lunch-3 course (green salad, sirloin steak (medium, potato), dessert (pending)), and the other orders a lunch-3 course (corn soup, sirloin steak (rare, potato), dessert (pending)); the order information is multiplied inputted to the terminal 10; then the order of the lunch-3 course (corn soup, sirloin steak (rare, potato), dessert (pending)) is cancelled.

The terminal 10 performs the first slip data segmentation process in response to an instruction by the waitperson. The multiplied data segmentation process S11 is performed, and the slip data display screen 200 shown in FIG. 8A appears, as the course meal selection screen information, on the display 14 in Step S13.

The slip data display screen 200 has an item information display field (order information list) 210. The item information display field 210 displays the ordered course meals, and their course items and modifying items, and receives touch input for selection of the course meal and course item, for example: In Step S13, the waitperson touches the display region of the item information display field 210 to select the lunch-3 course through the operation unit 12.

In Step S15, the course item selection screen 300 shown in FIG. 8B appears, as the course item selection screen information based on the course number-classified list, on the display 14. The course item selection screen 300 includes a course item type selection field 310, an item selection field 320, and a segmentation execution button 330.

The course item type selection field 310 displays the registered course items of all types (appetizer, main, and dessert), and receives touch input for selection of the type of the course item of the course meal to be segmented. The item selection field 320 displays combinations of the course items and modifying items corresponding to the type of the course item selected in the course item type selection field 310, and receives the touch input for selection of the combination of the course item and the modifying items corresponding to the type of the course item of the course meal to be segmented. The segmentation execution button 330 receives the touch input for performing the segmentation of the course meal.

In Step S15, the waitperson touch-inputs corn soup for appetizer, sirloin steak for main, and rare and potato for modifying item, from the course item type selection field 310 and the item selection field 320 through the operation unit 12. Upon touch of the segmentation execution button 330, the process goes to Step S16, and the detailed slip database 40 is changed to the detailed slip database 40A shown in FIG. 10.

The detailed slip database 40A includes: a record group R1 of the segmented course meal (lunch-3 course (corn soup, sirloin steak (rare, potato), dessert (pending)) for one guest; and a record group R2 of the course meals for two guests, from which the course meal of record group R1 has been segmented. After the first slip data segmentation process, the slip data display screen information based on the detailed slip database 40A appears on the display 14 of the terminal 10 as the slip data display screen 200A shown in FIG. 9.

The slip data display screen 200A has an item information display field 210A. The item information display field 210A displays information on the course meals, the course items, and the modifying items after the course meal segmentation. The item information display field 210A contains item information G1 corresponding to the record group R1 and item information G2 corresponding to the record group R2.

When the waitperson inputs a deletion instruction by selectively touching the item information G1 on the slip data display screen 200A through the operation unit 12, the CPU 11 changes the detailed slip database 40A to the detailed slip database 40B shown in FIG. 11. The slip data display screen information based on the detailed slip database 40A corresponds to the result of the slip data display screen 200A from which the item information G1 is removed.

In the terminal 10, the order information from the guests is reflected to the detailed slip database 40. The terminal 10 transmits the order information, such as "cooking preparation" that prompts preparation of cooking of the item and information on the item, and "instruction of the cooking" that prompts the cooking of the item and information on the item, through the communication unit 16 to the printer 20A in the kitchen that then prints the information. The chef prepares or cooks the items with reference to the printed order information. If a course meal is cancelled through the terminal 10 after the print of the order information, the detailed slip database 40 is changed and order cancel information instructing the cancel of the cooking of the course meal is transmitted to the printer 20A at kitchen through the communication unit 16 and printed by the printer 20A. The chef cancels the preparation or cooking of the item with reference to the printed order information.

With reference to FIGS. 12 and 13, the second slip data segmentation process performed by the terminal 10 will be described. FIG. 12 is a flow chart illustrating the second slip data segmentation process. FIG. 13 illustrates the detailed slip database 40C.

The second slip data segmentation process segments the record of the course meals in the detailed slip database 40C generated by multiplied input of the course meals in the same table (slip) by the course item. When the waitperson inputs the order of course meals of a group of guests at a table in the eating place through the operation unit 12, the terminal 10 generates a detailed slip database 40C shown in FIG. 13 and stores the database in the storage 15.

When an additional order on the modifying item of the course item of one course meal among the course meals in the group of guests is issued, the detailed slip database 40C should be updated. The detailed slip database 40, however, contains the consolidated record of the course meals after the multiplied input. Thus, the record of the detailed slip database 40C should preferably be segmented by the course item. Accordingly, the detailed slip database 40C includes a record at level 44=0 of course meals and their items generated by one multiplied input operation.

When the waitperson inputs the instruction to execute the second slip data segmentation process from the operation unit 12 of the terminal 10, the CPU 11 performs the second slip data segmentation process in cooperation with the second slip data segmenting program 152 retrieved from the storage 15 and loaded into the RAM 13.

With reference to FIG. 12, the CPU 11 performs the multiplied data segmentation process (Step S71). The CPU 11 then retrieves the detailed slip database 40 from the storage 15, generates course item group selection screen information based on the detailed slip database 40 to display it on the display 14, and receives the selection input by the waitperson of course item group (the same course items) as the subject of segmentation through the operation unit 12 (Step S72). The CPU 11 retrieves the course number-classified list corresponding to the course item group of the course meal selected in Step S72 from the RAM 13 (Step S73).

The CPU 11 generates course item selection screen information based on the course number-classified list retrieved from Step S73, displays it on the display 14, and receives the input for selection of a combination of the course item and modifying item(s) in the course meal to be segmented by the wait person through operation unit (Step S74). The CPU 11 changes the detailed slip database 40 such that the record of the course item and the modifying item(s) is segmented in response to the course item and modifying item(s) selected in Step S74 (Step S75), to complete the second slip data segmentation process.

With reference to FIGS. 14 to 17, a specific example of the second slip data segmentation process will be described. FIG. 14 illustrates a slip data display screen 200B after registration of the slip data. FIG. 15A illustrates a course item selection screen 400. FIG. 15B illustrates a slip data display screen 200C after segmentation of the course items. FIG. 16A illustrates a detailed slip database 40D after segmentation of the course items. FIG. 16B illustrates a detailed slip database 40E after addition of a record of the modifying items. FIG. 17 illustrates a slip data display screen 200D after addition of the modifying items.

The waitperson performs multiplied input of the course meals from the terminal 10 to store the detailed slip database 40C shown in FIG. 13 into the storage 15. In detail, three guests occupy the same table and order lunch-3 courses (green salad, sirloin steak (rare, potato), dessert (pending)), and this order information is multiplied-inputted to the terminal 10. One of the guests puts an additional order, i.e., topping of "onion" and "mushroom" for the main sirloin steak of the lunch-3 course.

The terminal 10 performs the second slip data segmentation process under an execution instruction by the waitperson. After the multiplied data segmentation process S71 is carried out, the slip data display screen 200B shown in FIG. 14 appears, as the course item group selection screen information, on the display 14 in Step S72.

The slip data display screen 200B has an item information display field 210B similar to the item information display field 210. In Step S72, the waiter selects sirloin steak as a course item group by touch input of the display region of the sirloin steak in the item information display field 210C through the operation unit 12.

Figures 15A, 15B:
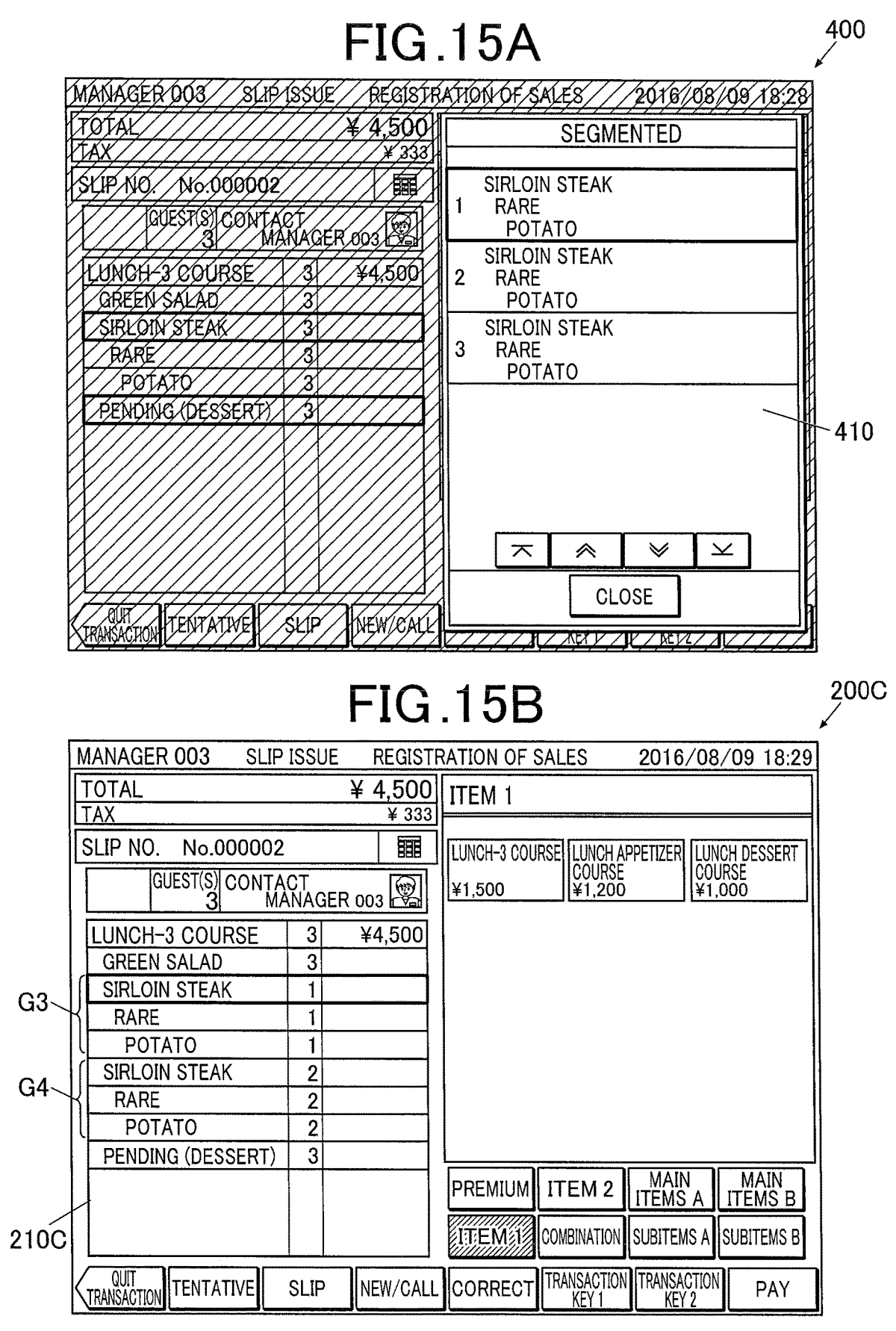

In Step S74, the course item selection screen 400 shown in FIG. 15A appears, as the course item selection screen information based on the course number-classified list, on the display 14. The course item selection screen 400 has an item selection field 410 similar to the item selection field 320.

In Step S74, the waitperson touch-inputs the first box in the item selection field 410, i.e., "sirloin steak" for the main, and "rare" and "potato" for the modifying items, through the operation unit 12. In Step S75, the detailed slip database 40C is changed to the detailed slip database 40D shown in FIG. 16A.

In the record of three course meals (lunch-3 courses) in the detailed slip database 40D, the record group of sirloin of the main is segmented into a record group R3 for one quest and a record group R4 for two guests. After the second slip data segmentation process, terminal 10 displays the slip data display screen information based on the detailed slip database 40D as the slip data display screen 200C shown in FIG. 15B on the display 14.

The slip data display screen 200C has an item information display field 210C. The item information display field 210C displays information on the course meals, course items, and modifying items after course item segmentation. The item information display field 210C has item information G3 corresponding to the record group R3 and item information G4 corresponding to the record group R4.

With reference to the slip data display screen 200C, the waitperson selects sirloin steak of the item information G3 by touch input for addition of the topping on the slip data display screen 200 through the operation unit 12. Upon input of an instruction to display the addition of the modifying items, a slip data display screen 200D shown in FIG. 17 appears. The slip data display screen 200D has an item information display field 210D and a modifying item list display part 220. The modifying item list display part 220 has a button for selecting the topping modifying items from potato, onion, mushroom, asparagus, and carrot topping modifying item. When the waitperson touches the selection buttons for onion and mushroom as toppings each one time through the operation unit 12, the CPU 11 changes the detailed slip database 40D to the detailed slip database 40E shown in FIG. 16B.

In the detailed slip database 40E, a record group R5 with the item codes 45 consisting of 010001 for onion and 010002 for mushroom is added below the record group R3 of the detailed slip database 40D based on the inputted onion and mushroom. The slip data display screen information based on the detailed slip database 40E corresponds to the slip data display screen 200D shown in FIG. 17. The slip data display screen 200D corresponds to the slip data display screen 200C of the item information display field 210D to which item information G5 of the lines of onion and mushroom is added below the item information G3.

In the embodiment described above, the terminal 10 receives input of the segmentation subject information indicating the segmentation subject in the slip information (detailed slip database 40) on the course meals generated by multiplied input through the operation unit 12, and segments the slip information on the segmentation subject from the slip information on the course meals, based on the input segmentation subject information.

Mere input of the segmentation subject (information) facilitates segmentation of the slip information on part of the course meals with reduced workload of the waitperson.

The segmentation subject is at least one course meal among the course meals. Thus, the slip information on at least one course meal can be readily segmented from the slip information on the course meals.

The segmentation subject information is information on a selection of combination of items of at least one of the course meals. Thus, slip information on at least one course meal with a combination of desired items can be certainly segmented from slip information on the course meals.

The segmentation subject is a course item in the course meals. Thus, slip information on at least one course meal can be certainly segmented from the slip information on the course meals. Thus, the slip information on at least one course item can be certainly segmented from the slip information on the course meals.

The segmentation subject information is information on a selection of combination of modifying items of the course item of the course meals. Thus, the slip information on at least one course item with a combination of desired modifying items can be certainly segmented from the slip information on the course meals.

In the above description, computer readable media for the programs of the present invention are HDDs, SSDs, and flash memories of the storage 15. Any other portable recording media, such as CD-ROM can also be used. Carrier waves can also be used as a medium that provides program data of the present invention through communication lines.

The description of the embodiments of the present invention is mere examples of the order information processing device and the program and thus should not be construed to limit the present invention.

For example, the first slip data segmentation process and the second slip data segmentation process are performed separately. Alternatively, these may be performed in combination as appropriate.

In the order managing system 1 according to the embodiment described above, the terminal 10 is disposed in the store and the waitperson views and input information through the terminal 10. Any other configuration is also available. For example, the order entry system may include a radio communication server such as a terminal 10 and a handy terminal carried by the waitperson. The waitperson views and inputs the information through the handy terminal.

The segmentation subject is the order information on the course meal in the embodiment described above. Alternatively, the segmentation subject may be a set course and a single-item course (for example, a single course or a single item with selectable topping), besides the course meal.

The embodiment described above describes addition of modifying items to the course items of the course meals (addition of item information G5 on onion and mushroom in FIG. 17). Alternatively, the course items may be deleted or changed. For example, the potato in the item information G3 may be deleted, and any other modifying item may be added or modified after the deletion of the potato.

It should be appreciated that the detailed configuration and operation of the constituents of the order managing system 1 according to the embodiment can be appropriately modified within the gist of the present invention.

The scope of the present invention should not be limited to the embodiment described above and should contain the claimed invention and its equivalent.

The following are claims attached to the original application. The number of each claim is the same as that of each claim attached to the original application.

What is claimed is:

1. An order information processing device comprising:
an input member configured to receive input of pieces of order information of a course meal for each of several guests, wherein each of the course meals comprises several dishes; and
a processor configured to:
perform display control processing of displaying a first order information set comprising the order information and order quantity information related with each other when the input member receives input of the order information;
perform, in response to receiving an instruction to change or delete a dish of the course meal for one guest of the several guests, segmentation processing of segmenting the first order information set into a first piece among the pieces of the order information of the course meals, which is displayed as the first order information set, and a second order information set in which subtraction is performed on the order quantity information,
in response to segmenting the first order information set in the segmentation processing, display the first piece and the second order information set; and
perform changing on or deletion of the dish of the course meal for the one guest in the first piece.

2. The order information processing device according to claim 1,
wherein the processor is configured to perform, in response to receiving a selection of the first order information set to be segmented and in response to receiving the instruction to change or delete the dish of the course meal for the one guest of the several guests, the segmentation processing.

3. The order information processing device according to claim 1,
wherein the processor is configured to control a storage to store a record comprising the order information and the order quantity information related with each other when the input member receives input of same pieces of the order information of the course meals.

4. The order information processing device according to claim 3,
wherein the processor is configured to, in response to receiving the instruction to change or delete the dish of the course meal for the one guest in the first piece among the same pieces of the order information, segment the same pieces of the order information into at least two records and control the storage to store the at least two records.

5. A non-transitory computer readable storage medium that stores a program executable by a computer to execute functions of:
receiving, from an input member, input of pieces of order information of a course meal for each of several guests, wherein each of the course meals comprises several dishes;
performing display control processing of displaying a first order information set comprising the order information and order quantity information related with each other when the input member receives input of the order information;
performing, in response to receiving an instruction to change or delete a dish of the course meal for one guest of the several guests, segmentation processing of segmenting the first order information set into a first piece among the pieces of the order information of the course meals, which is displayed as the first order information set, and a second order information set in which subtraction is performed on the order quantity information;
in response to segmenting the first order information set in the segmentation processing, displaying the first piece and the second order information set; and
performing changing on or deletion of the dish of the course meal for the one guest in the first piece.

6. An order information processing method comprising:
receiving, from an input member, input of pieces of order information of a course meal for each of several guests, wherein each of the course meals comprises several dishes;
performing display control processing of displaying a first order information set comprising the order information and order quantity information related with each other when the input member receives input of the order information;
performing, in response to receiving an instruction to change or delete a dish of the course meal for one guest of the several guests, segmentation processing of segmenting the first order information set into a first piece among the pieces of the order information of the course meals, which is displayed as the first order information set, and a second order information set in which subtraction is performed on the order quantity information;
in response to segmenting the first order information set in the segmentation processing, displaying the first piece and the second order information set; and
performing changing on or deletion of the dish of the course meal for the one guest in the first piece.

* * * * *